(12) United States Patent
Stanford et al.

(10) Patent No.: US 9,769,090 B2
(45) Date of Patent: Sep. 19, 2017

(54) ADJUSTING CURRENT LIMIT THRESHOLDS BASED ON POWER REQUIREMENT OF POWERED DEVICE IN SYSTEM FOR PROVIDING POWER OVER COMMUNICATION LINK

(75) Inventors: Clayton Reynolds Stanford, Summerland, CA (US); Jeffrey Lynn Heath, Santa Barbara, CA (US); Kirk Tzukai Su, Santa Barbara, CA (US); Harry Joseph Kleeburg, Goleta, CA (US)

(73) Assignee: LINEAR TECHNOLOGY CORPORATION, Milpitas, CA (US)

( * ) Notice: Subject to any disclaimer, the term of this patent is extended or adjusted under 35 U.S.C. 154(b) by 1600 days.

(21) Appl. No.: 11/252,567

(22) Filed: Oct. 19, 2005

(65) Prior Publication Data
US 2006/0164769 A1   Jul. 27, 2006

Related U.S. Application Data

(63) Continuation of application No. 60/646,509, filed on Jan. 25, 2005.

(51) Int. Cl.
*H02H 9/08* (2006.01)
*H04L 12/931* (2013.01)
*H04L 12/10* (2006.01)

(52) U.S. Cl.
CPC ............ *H04L 49/351* (2013.01); *H04L 12/10* (2013.01)

(58) Field of Classification Search
CPC .............................. H04L 49/351; H04L 12/10
USPC ....................................................... 361/93.9
See application file for complete search history.

(56) References Cited

U.S. PATENT DOCUMENTS

| | | | |
|---|---|---|---|
| 6,011,323 A * | 1/2000 | Camp ............................ | 307/64 |
| 6,473,608 B1 * | 10/2002 | Lehr et al. ................... | 455/402 |
| 6,973,394 B2 | 12/2005 | Jaeger et al. | |
| 7,030,596 B1 * | 4/2006 | Salerno et al. ............... | 323/282 |

(Continued)

FOREIGN PATENT DOCUMENTS

| | | |
|---|---|---|
| CN | 1354595 A | 6/2002 |
| CN | 1364026 A | 8/2002 |

(Continued)

OTHER PUBLICATIONS

International Search Report and Written Opinion of the International Searching Authority issued in corresponding Application No. PCT/US2006/001284, dated Sep. 27, 2006.*

(Continued)

*Primary Examiner* — Thienvu Tran
*Assistant Examiner* — Lucy Thomas
(74) *Attorney, Agent, or Firm* — McDermott Will & Emery LLP

(57) ABSTRACT

Novel system and methodology for adjusting a current limit threshold in a Power over Ethernet (PoE) system in accordance with requirements of a Powered Device (PD). A system for supplying power to a PD over a communications link has a requirement determining circuit for determining a PD's requirement, and a control circuit for setting a parameter restricting an output signal of the PSE in accordance with the determined PD's requirement. The control circuit may set a current limit threshold of the PSE and/or the PD in accordance with the determined PD's requirement, such as a power requirement.

22 Claims, 2 Drawing Sheets

(56) References Cited

U.S. PATENT DOCUMENTS

| | | | |
|---|---|---|---|
| 7,042,280 B1 * | 5/2006 | Huang et al. | 327/541 |
| 7,286,556 B1 * | 10/2007 | Jackson | 370/445 |
| 2002/0042229 A1 | 4/2002 | Vergnaud | |
| 2002/0191553 A1 | 12/2002 | Lehr et al. | |
| 2003/0036819 A1 | 2/2003 | Lehr et al. | |
| 2004/0212423 A1 | 10/2004 | Inagaki | |
| 2006/0109728 A1 * | 5/2006 | Dwelley et al. | 365/222 |

FOREIGN PATENT DOCUMENTS

| | | |
|---|---|---|
| CN | 1157022 C | 7/2004 |
| CN | 1540858 A | 10/2004 |
| JP | 09-163639 | 6/1997 |

OTHER PUBLICATIONS

"Power over Ethernet: Cisco Inline Power and IEEE 802.3af," Cisco Systems, Inc., 2004, XP-002383688, pp. 1.13.*

International Search Report and Written Opinion of the International Searching Authority issued in corresponding Application No. PCT/US2006/002242, dated Aug. 25, 2006.

Galit Mendelson, "All You Need to Know About Power over Ethernet (PoE) and the IEEE 802.3af Standard", Jun. 2004, Powerdsine Propriety Information.

English translation of Chinese Office Action issued in Chinese Patent Application No. CN 2006800093423, mailed Dec. 5, 2008.

Chinese Office Action issued in Chinese Patent Application No. 200680005472X dated Nov. 7, 2008.

Chinese Office Action issued in Chinese Patent Application No. 2006800031997 dated Nov. 7, 2008.

Chinese Office Action issued in Chinese Patent Application No. 2006800031925 dated Nov. 7, 2008.

+48V, Single-Port Network Power Switch for Power-Over-LAN, MAX5922, Maxim, 2003. <http://datasheets.maxim-ic.com/en/ds/MAX5922.pdf>.

Chinese Office Action issued in Application No. 201110381824.4 dated Dec. 3, 2013.

Notification of Second Office Action issued in corresponding Chinese Patent Application No. 201110381824.4, mailed on Mar. 4, 2016; with English translation.

* cited by examiner

ADJUSTING CURRENT LIMIT THRESHOLDS BASED ON POWER REQUIREMENT OF POWERED DEVICE IN SYSTEM FOR PROVIDING POWER OVER COMMUNICATION LINK

This application claims priority of provisional U.S. patent application No. 60/646,509 filed on Jan. 25, 2005, and entitled "SYSTEM AND METHOD FOR SUPPORTING ADVANCED POWER OVER ETHERNET SYSTEM."

TECHNICAL FIELD

This disclosure relates to power supply systems, and more particularly, to circuitry and methodology for adjusting current limit thresholds in a system for providing power over a communication link, such as a Power over Ethernet (PoE) system, in accordance with a power requirement of a powered device.

BACKGROUND ART

Over the years, Ethernet has become the most commonly used method for local area networking. The IEEE 802.3 group, the originator of the Ethernet standard, has developed an extension to the standard, known as IEEE 802.3af, that defines supplying power over Ethernet cabling. The IEEE 802.3af standard defines a Power over Ethernet (PoE) system that involves delivering power over unshielded twisted-pair wiring from a Power Sourcing Equipment (PSE) to a Powered Device (PD) located at opposite sides of a link. Traditionally, network devices such as IP phones, wireless LAN access points, personal computers and Web cameras, have required two connections: one to a LAN and another to a power supply system. The PoE system eliminates the need for additional outlets and wiring to supply power to network devices. Instead, power is supplied over Ethernet cabling used for data transmission.

As defined in the IEEE 802.3af standard, PSE and PD are non-data entities allowing network devices to supply and draw power using the same generic cabling as is used for data transmission. A PSE is the equipment electrically specified at the point of the physical connection to the cabling, that provides the power to a link. A PSE is typically associated with an Ethernet switch, router, hub or other network switching equipment or midspan device. A PD is a device that is either drawing power or requesting power. PDs may be associated with such devices as digital IP telephones, wireless network access points, PDA or notebook computer docking stations, cell phone chargers and HVAC thermostats.

The main functions of the PSE are to search the link for a PD requesting power, optionally classify the PD, supply power to the link if a PD is detected, monitor the power on the link, and disconnect power when it is no longer requested or required. A PD participates in the PD detection procedure by presenting PoE detection signature defined by the IEEE 802.3af standard.

If the detection signature is valid, the PD has an option of presenting a classification signature to the PSE to indicate how much power it will draw when powered up. A PD may be classified as class 0 to class 4. A PD of class 1 requires that the PSE supplies at least 4.0 W, a PD of class 2 requires that the PSE supplies at least 7.0 W, and a PD of class 0, 3 or 4 requires at least 15.4 W. Based on the determined class of the PD, the PSE applies the required power to the PD.

When power is supplied to the PD, the PSE monitors its output current with respect to certain current limit thresholds, such as the maximum output current of the PSE at a short circuit condition ($I_{LIM}$), and the overload current detection range ($I_{CUT}$). In particular, the PSE should be able to withstand without damage the application of short circuits of any wire to any other wire within a power supply cable, if the magnitude of the current through such a short circuit does not exceed $I_{LIM}$. Further, an overload condition may be detected when an output current of the PSE exceeds $I_{CUT}$ for a time period exceeding an overload time limit ($T_{ovld}$).

In many PSEs, values of $I_{LIM}$ and $I_{CUT}$ are maintained at fixed levels in the corresponding ranges defined by the IEEE 802.3af standard. For example, the value of $I_{LIM}$ may be maintained at 425 mA, while the value of $I_{CUT}$ may be kept at 375 mA. However, to enable the PSE to operate with various types of PDs and meet various power needs, it would be desirable to make the current limit thresholds adjustable in accordance with requirements of the PDs.

Further, the IEEE 802.3af standard specifies an input current limit threshold in a PD. In particular, the standard limits an input inrush current $I_{Inrush}$ in a PD to the 400 mA maximum. However, it would be desirable to make the input current limit threshold adjustable in accordance with the PD's requirements.

SUMMARY OF THE DISCLOSURE

The present disclosure offers a novel system and methodology for adjusting current limit thresholds in a power supply device and/or a powered device (PD) in accordance with requirements of the PD.

In accordance with one aspect of the disclosure, a system for supplying power to a PD over a communication link has a requirement determining circuit for determining a PD's requirement, and a control circuit for setting a parameter restricting an output signal of the PSE in accordance with the determined PD's requirement. For example, the PD may be supplied with power by Power Sourcing Equipment (PSE) over the Ethernet.

In particular, the control circuit may set a current limit threshold in accordance with the determined PD's requirement, such as a power requirement. For example, a maximum output current of the PSE at a short circuit condition and/or an overload current detection range of the PSE may be adjusted in accordance with the power requirement of the PD.

Further, an input current threshold of the PD may be adjusted in accordance with the power requirement of the PD.

In accordance with an embodiment of the disclosure, the control circuit may select an appropriate value of the current limit threshold of the PSE among multiple predetermined values in accordance with a power requirement of the PD. The determining circuit may determine the PD's power requirement based on a classification procedure.

The PSE may further comprise a current limit circuit controllable by the control circuit for limiting an output current of the PSE. In particular, the current limit circuit may control an output field-effect transistor or bipolar transistor of the PSE to prevent the output current of the PSE from exceeding the maximum output current of the PSE at a short circuit condition.

Further, the current limit circuit may enable the PSE to turn off the output transistor of the PSE when the output current of the PSE exceeds a determined overload current detection range for a time period exceeding a predetermined time limit.

In accordance with a method of the present disclosure, the following steps may be carried out to control a power supply device:
- determining a power requirement of a load powered by the power supply device, and
- adjusting a current limit threshold in accordance with the determined power requirement.

In particular, a maximum output current of the power supply device at a short circuit condition and/or an acceptable overload current of the power supply device may be adjusted in accordance with the determined power requirement.

Further, a maximum input current of the load may be adjusted in accordance with the determined power requirement.

In accordance with another aspect of the disclosure, a PoE system may comprise a PD, a PSE for supplying power to the PD, and an adjustment circuit for adjusting a current limit threshold of the PSE and/or PD based on information on the PD. In particular, the adjustment circuit may adjust the current limit threshold in accordance with a power requirement of the PD.

In accordance with a further aspect of the disclosure, a local area network comprises at least a pair of network nodes, a network hub, and communication cabling for connecting the network nodes to the network hub to provide data communications. The network hub has a power supply device for providing power to a load over the communication cabling. The network includes a requirement determining circuit for determining a requirement of a load, and a control circuit for setting a parameter restricting a current in a system for providing power over the communication cabling in accordance with the determined requirement of the load.

In particular, the control circuit may determine a current limit threshold of the power supply device and/or an input current threshold of the load in accordance with a power requirement of the load.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using the example of adjusting values of the maximum output current of the PSE at a short circuit condition ($I_{LIM}$), and the overload current detection range ($I_{CUT}$) in a Power over Ethernet (PoE) system. It will become apparent, however, that the concepts described herein are applicable to any network.

For example, the system of the present disclosure may be provided in a local area network (LAN) having a plurality of nodes, a network hub and communication cabling connecting the nodes to the network hub for providing data communications. The network hub may include a power supply device, and the communication cabling may be utilized for supplying power from the power supply device to a load.

Moreover, as one skilled in the art would realize, the concept of the present disclosure may be utilized for adjusting a value of the maximum input current of the load, such as a PD.

Figure 1:
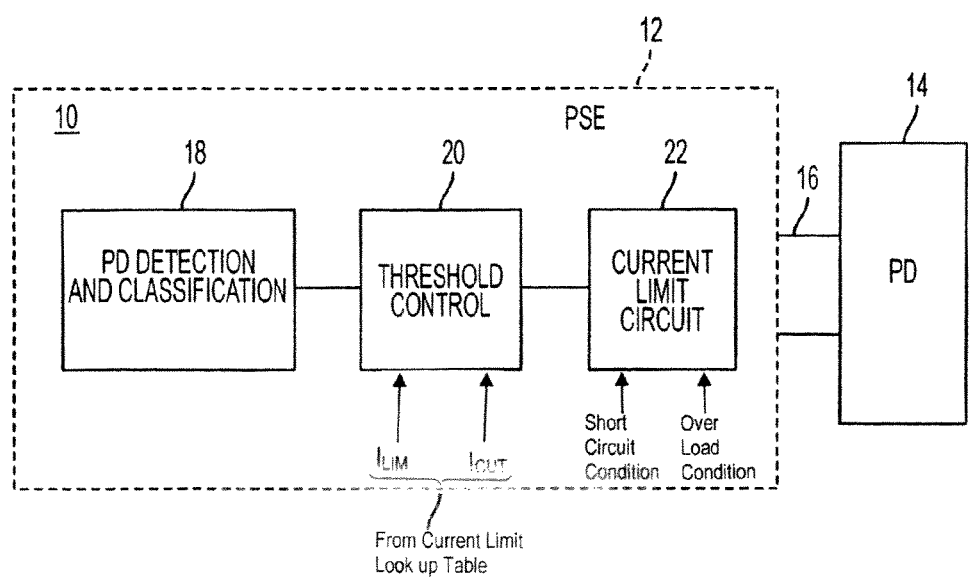
FIG. 1 is block-diagram illustrating a current limit adjusting mechanism of the present disclosure.

FIG. 1 shows a simplified block-diagram illustrating a current limit adjusting mechanism 10 of the present disclosure in a PoE system comprising a PSE 12, and a PD 14 connectable to the PSE 12 via a link 16 that may be provided using 2 or 4 sets of twisted pairs within the Ethernet cable. For example, the PSE 12 may be arranged on a separate chip. As described in more detail below, the current limit adjusting mechanism 10 of the present disclosure may carry out its operations using a PD detection and classification circuit 18, a threshold control circuit 20 and a current limit circuit 22. These circuits may be arranged on the PSE chip 12.

The current limit circuit 22 is provided in the PSE 12 to respond to overcurrent events such as a short-circuit condition and an overload condition. For example, the IEEE 802.3af standard requires a PSE to be able to withstand without damage the application of short circuits of any wire to any other wire within a power supply cable, if the magnitude of the current through such a short circuit does not exceed current $I_{LIM}$ referred to as a maximum output current of the PSE at a short circuit condition.

Further, the IEEE 802.3af standard requires a PSE to remove power from a power interface when the overload condition is detected. An overload condition may be detected when an output current of the PSE exceeds current $I_{CUT}$ (referred to as an overload current detection range) for a time period exceeding a predetermined time interval such as an overload time limit ($T_{ovld}$).

The current limit circuit 22 monitors output current of the PSE 12 to keep the current at or below $I_{LIM}$. Also, the current limit circuit 22 indicates when the output current of the PSE 12 exceeds $I_{CUT}$ for a time period exceeding a predetermined time interval to enable the PSE 12 to remove power supplied to the PD 14.

In many PSEs, values of $I_{LIM}$ and $I_{CUT}$ are maintained at fixed levels in the corresponding ranges defined by the IEEE 802.3af standard. For example, the value of $I_{LIM}$ may be maintained at 425 mA, while the value of $I_{CUT}$ may be kept at 375 mA. However, the current limit adjusting mechanism 10 of the present disclosure allows current limit thresholds $I_{LIM}$ and $I_{CUT}$ to be adjusted in accordance with specific PD's requirements.

In particular, the current limit thresholds may be controlled in accordance with a power requirement of a PD. For example, the detection and classification circuit 18 may be used to provide information on the PD's power requirement. As defined in the IEEE 802.3af standard, the PSE 12 and PD 14 participate in a PD detection procedure, during which the PSE 12 probes the link 16 to detect a PD. If the PD is detected, the PSE 12 checks the PD detection signature to determine whether it is valid or non-valid. The valid and non-valid detection signatures are defined in the IEEE 802.3af standard. While the valid PD detection signature indicates that the PD is in a state where it will accept power, the non-valid PD detection signature indicates that the PD is in a state where it will not accept power.

If the signature is valid, the PD has an option of presenting a classification signature to the PSE to indicate how much power it will draw when powered up. A PD may be classified as class 0 to class 4. A PD of class 1 requires that the PSE supplies at least 4.0 W, a PD of class 2 requires that the PSE supplies at least 7.0 W, and a PD of class 0, 3 or 4 requires at least 15.4 W. Moreover, a PD may identify itself as a device requesting higher power than the IEEE 802.3af standard requires to provide. A high-power PSE may be able to supply the requested power. Hence, PD's power requirements may vary in a broad range.

The PD detection and classification circuit 18 may determine a power requirement of the PD 14 and provide corresponding information to the threshold control circuit 20 for producing current limit threshold values appropriate for the determined power requirement. For example, the threshold control circuit 20 may interact with a current limit look-up table that stores values of current limit thresholds $I_{LIM}$ and $I_{CUT}$ for various PD power requirements. Based on a particular value of power required by the PD 14, the threshold control circuit 20 may access the current limit look-up table to determine values of $I_{LIM}$ and $I_{CUT}$ for that particular power value. The threshold control circuit 20 may contain multiple current sources provided limit values selectable in accordance with determined values of $I_{LIM}$ and $I_{CUT}$ to provide respective threshold voltages $V_{LIM}$ and $V_{CUT}$ to the current limit circuit 22.

Figure 2:
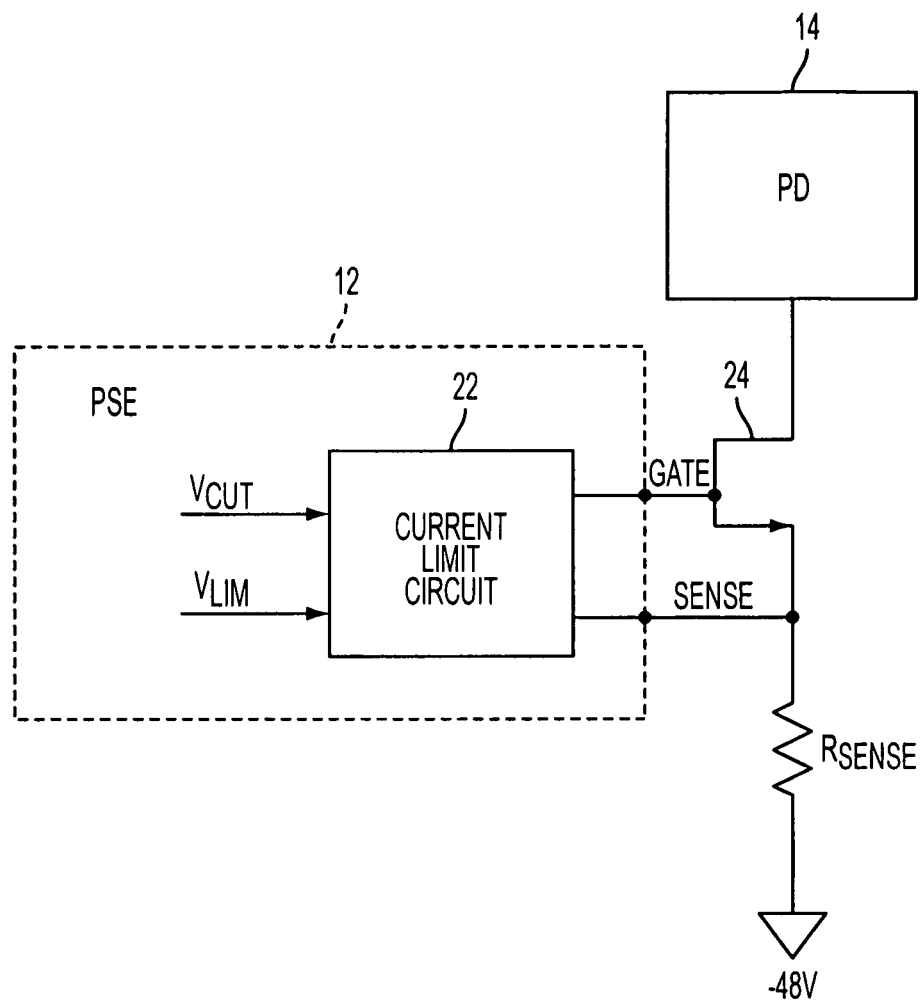
FIG. 2 is a diagram illustrating operation of a current limit circuit of the present disclosure.

As shown in FIG. 2, delivery of power from the PSE 12 to the PD 14 may be provided by controlling the gate drive voltage of an external power MOSFET 24 via a terminal Gate. For example, the MOSFET 24 may couple −48V input supply to the PSE output port in a controlled manner that satisfies the PD's power requirement. The current limit circuit 22 monitors the output current of the PSE 12 via a terminal Sense by monitoring voltage Vsense across external sense resistor Rsense coupled to the MOSFET 24.

As discussed above, the threshold control circuit 20 supplies the current limit circuit 22 with the threshold voltage $V_{LIM}$, which may be determined as $I_{LIM} \times Rs$ based on the $I_{LIM}$ value selected for a particular PD power requirement. The current limit circuit 22 may control the gate voltage of the MOSFET to reduce the output current of the PSE when the monitored voltage Vsense exceeds the threshold voltage $V_{LIM}$. For example, the current limit circuit 22 may contain an operational amplifier that compares the threshold voltage $V_{LIM}$ with the sense voltage Vsense to produce an output voltage that reduced the gate voltage of the MOSFET 24 when the voltage Vsense exceeds the threshold voltage $V_{LIM}$. As a result, the output current of the PSE 12 is maintained at or below the $I_{LIM}$ level.

Further, the threshold control circuit 20 may provide the current limit circuit 22 with the threshold voltage $V_{CUT}$, which may be determined as $I_{CUT} \times Rs$ based on the $I_{CUT}$ value selected for a particular PD power requirement. The current limit circuit 22 may indicate when the monitored voltage Vsense exceeds the threshold voltage $V_{CUT}$ for a time period exceeding a predetermined time interval, in order to remove the power supplied to the PD 14. In particular, the current limit circuit 22 may have an overload timer activated when the sense voltage Vsense exceeds the threshold voltage $V_{CUT}$. If the sense voltage Vsense is still above the $V_{CUT}$ level when an overload time limit defined by the timer expires, the MOSFET 24 will be turned off to remove the power supplied to the PD 14. For example, the overload time limit may be in the range between 50 ms and 75 ms to comply with the IEEE 802.3af standard.

Hence, the current limit adjusting mechanism of the present disclosure adjusts $I_{LIM}$ and/or $I_{CUT}$ threshold values in accordance with a particular PD's power need.

Further, the IEEE 802.3af standard limits an input inrush current $I_{Inrush}$ in a PD to the 400 mA maximum. In addition to controlling the output current limit threshold in the PSE or instead of controlling the output current limit threshold, the current limit adjusting mechanism of the present disclosure may be utilized for adjusting the input current limit threshold in the PD.

For example, the PD 14 may include an input current limit circuit that compares an input current of the PD with an input current threshold to limit the input current to the maximum value set by the input current threshold. The input current threshold may be adjusted in accordance with a particular power requirement of the PD. In particular, the PD may be enabled to operate with a higher input current when the PD requires a higher power.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. For example, instead of adjusting $I_{LIM}$ and/or $I_{CUT}$ threshold values, the adjusting mechanism of the present disclosure may provide adjustment of other signals and/or parameters of a PSE and/or a PD in accordance with PD's requirements.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A system for supplying power to a powered device (PD) over a communication link, comprising a current limit adjusting mechanism including:
   a current limit circuit for monitoring current in the system, the current limit circuit being responsive to a first overcurrent event so as to restrict the current based on a first current limit threshold defined to respond to the first overcurrent event,
   a current limit threshold storage for storing values of the first current limit threshold for various PD power requirements,
   a power requirement determining circuit for determining a power requirement of the PD, and
   a threshold control circuit for accessing the current limit threshold storage to determine a stored value of the first current limit threshold for a particular power value required by the PD,
   the threshold control circuit being configured to provide the current limit circuit with a first threshold value produced in accordance with the determined stored value of the first current limit threshold, the current limit circuit being configured to compare a value representing the monitored current with the provided first threshold value so as to restrict the current based on the provided first threshold value.

2. The system of claim 1, wherein the PD is supplied with power by a Power Sourcing Equipment (PSE) over the Ethernet.

3. The system of claim 1, wherein
the current limit circuit is configured to respond to a second overcurrent event so as to restrict the current based on a second current limit threshold defined to respond to the second overcurrent event, and
the threshold control circuit is configured for providing the current limit circuit with a second threshold value produced in accordance with a value of the second current limit threshold stored in the current limit threshold storage for the particular power value required by the PD.

4. The system of claim 1, wherein the threshold control circuit is configured for adjusting a maximum output current of the PSE at a short circuit condition in accordance with the power requirement of the PD.

5. The system of claim 1, wherein the threshold control circuit is configured for adjusting an overload current detection range of the PSE in accordance with the power requirement of the PD.

6. The system of claim 1, wherein the current limit circuit is controllable by the threshold control circuit for limiting the output current of the PSE.

7. The system of claim 6, wherein the current limit circuit is configured for controlling an electrode of an output transistor of the PSE to prevent the output current of the PSE from exceeding a determined maximum output current of the PSE at a short circuit condition.

8. The system of claim 6, wherein the current limit circuit is configured for enabling the PSE to turn off an output transistor of the PSE when the output current of the PSE exceeds a determined overload current detection range for a time period exceeding a predetermined time limit.

9. The system of claim 2, wherein the power determining circuit is configured to determine the power requirement of the PD based on a classification procedure.

10. The system of claim 1, wherein the threshold control circuit is configured for adjusting an input current limit threshold of the PD in accordance with the power requirement of the PD.

11. A method of controlling a power supply device, comprising the steps of:
storing values of a current limit threshold for various power requirements of a load powered by the power supply device, the current limit threshold defining a threshold used by the power supply device for restricting current in response to an overcurrent event,
determining a power requirement of the load,
determining a stored value of the current limit threshold for a particular power value required by the load,
producing a threshold value in accordance with the determined stored value,
monitoring current in the power supply device, and
comparing a value representing the monitored current with the threshold value to restrict the current based on the threshold value.

12. The method of claim 11, wherein a maximum output current of the power supply device at a short circuit condition is adjusted in accordance with the determined power requirement.

13. The method of claim 11, wherein a maximum overload current of the power supply device is adjusted in accordance with the determined power requirement.

14. The method of claim 11, wherein an input current of the load is adjusted in accordance with the determined power requirement.

15. A system for supplying power over the Ethernet, comprising:
a PSE for supplying power to a PD over an Ethernet link,
a current limit threshold storage for storing of values of a current limit threshold for various power requirements of the PD, the current limit threshold defining a threshold for restricting current in the system in response to an overcurrent event, and
a current limit adjusting mechanism including:
a current limit circuit for monitoring the current in the system, the current limit circuit being responsive to the overcurrent event so as to restrict the current based on the current limit threshold,
a power requirement determining circuit for determining a power requirement of the PD, and
a threshold control circuit for accessing the current limit threshold storage to determine a stored value of the current limit threshold for a particular power value required by the PD,
the threshold control circuit being configured for providing the current limit circuit with a threshold value produced in accordance with the determined stored value of the current limit threshold,
the current limit circuit being configured for comparing a value representing the monitored current with the threshold value so as to restrict the current of the PSE based on the threshold value.

16. The system of claim 15, wherein the threshold control circuit is configured for adjusting a maximum output current of the PSE at a short circuit condition in accordance with the power requirement of the PD.

17. The system of claim 15, wherein the threshold control circuit is configured for adjusting an overload current detection range of the PSE in accordance with the power requirement of the PD.

18. The system of claim 15, wherein the current limiting circuit is configured for limiting an output current of the PSE based on the threshold value.

19. The system of claim 15, wherein the threshold control circuit is configured for adjusting an input current limit threshold of the PD in accordance with the power requirement of the PD.

20. A local area network comprising:
at least a pair of network nodes,
a network hub, and
communication cabling for connecting the network nodes to the network hub to provide data communications,
the network hub having a power supply device for providing power to a load over the communication cabling, the network having a current limit adjusting mechanism, and a current limit threshold storage for storing values of a current limit threshold for various power requirements of the load, the current limit threshold defining a threshold for restricting current in the power supply device in response to an overcurrent event,
the current limit adjusting mechanism including:
a power requirement determining circuit for determining a power requirement of the load,
a current limit circuit for monitoring the current in the power supply device, the current limit circuit being responsive to the overcurrent event so as to restrict the current based on the current limit threshold, and a threshold control circuit for accessing the current limit threshold storage to determine a stored value of the current limit threshold for a particular power value required by the load, the threshold control circuit being configured for providing the current limit circuit with a threshold value produced in accordance with the determined stored value of the current limit threshold, the current limit circuit being configured to compare a value representing the monitored current with the threshold value so as to restrict the current based on the threshold value.

21. The network of claim 20, wherein the threshold control circuit is configured for determining a value of an output current limit threshold of the power supply device for the particular power value required by the load.

22. The network of claim 20, wherein the threshold control circuit is configured for determining a value of an input current limit threshold of the power supply device for the particular power value required by the load.

* * * * *